United States Patent [19]

Moran et al.

[11] 4,305,970

[45] Dec. 15, 1981

[54] EDIBLE EMULSIONS AND PROCESS FOR THEIR PREPARATION

[75] Inventors: David P. J. Moran, Covington, England; Janos Bodor, Voorburg, Netherlands

[73] Assignee: Lever Brothers Company, New York, N.Y.

[21] Appl. No.: 95,123

[22] Filed: Nov. 16, 1979

[30] Foreign Application Priority Data

Nov. 16, 1979 [GB] United Kingdom ............... 44800/78

[51] Int. Cl.$^3$ .......................... A23D 3/00; A23D 5/00
[52] U.S. Cl. ...................................... 426/603; 426/573
[58] Field of Search ..................... 426/311, 330.6, 573, 426/601, 602, 603

[56] References Cited

U.S. PATENT DOCUMENTS

| | | | |
|---|---|---|---|
| 2,194,218 | 3/1940 | Dickeson | 426/603 X |
| 2,422,633 | 6/1947 | Petersen | 426/603 X |
| 3,343,966 | 9/1967 | Lowenstein | 426/603 X |
| 3,589,910 | 6/1971 | Nikolaevich et al. | 426/104 X |
| 3,628,974 | 12/1971 | Battista | 426/602 X |
| 3,692,543 | 9/1972 | Powell | 426/602 |
| 3,717,469 | 2/1973 | Slonimsky et al. | 426/656 X |
| 3,729,322 | 4/1973 | Calvert | 426/602 X |

Primary Examiner—Robert A. Yoncoskie
Attorney, Agent, or Firm—James J. Farrell; Melvin H. Kurtz

[57] ABSTRACT

This invention provides emulsions comprising a continuous fatty phase and a dispersed liquid aqueous phase and dispersed gelled aqueous ingredients, e.g. prepared by blending a gelling agent containing low fat spread in line with one free from gelling agents.

3 Claims, No Drawings

EDIBLE EMULSIONS AND PROCESS FOR THEIR PREPARATION

The present invention relates to emulsions of the continuous fat type (W/O type emulsions) and to processes for their preparation.

The fat-continuous emulsions of the present invention include margarine and products of a relatively low fat content, which products, apart from being useful for spreading on bread, can find utility in the preparation of, for instance, bakery products.

The emulsions of the present invention comprise a continuous fatty phase, a dispersed liquid aqueous phase and dispersed, gelled, aqueous spherical ingredients.

In this Specification by the term "gelled" is understood the condition which liquid ingredients have achieved as a result of the formation of a rigid colloidal system by molecules and aggregates of molecules of the gelling system joining together to form a continuous framework. The spherical ingredients used in the emulsions of the invention are in a gelled condition at ambient temperature, e.g. 15°–20° C., and preferably have a gel stength of 0.1 and 30 N/cm$^2$ as measured by the Instron apparatus, using it in the linear compression test mode at room temperature (about 20° C.).

Similarly, the terms "gel", "gelling", etc. refer to the condition of, and the process leading to the formation of such a rigid colloidal system.

In this Specification the terms "oils" and "fats" are used as synonyms, unless otherwise indicated; a fatty phase is within the scope of the present invention the continuous phase of an emulsion and contains triglyceride oils and fats.

In the preparation of emulsions of the fat-continuous type it has been suggested to thicken one of the phases of the emulsion, and mostly the dispersed aqueous phase with, for example, fats, hydrophilic thickening agents like gums, proteins, etc.

Frequently problems in respect of diminished organoleptic qualities, insufficient microbiological keeping qualities and/or insufficient emulsion stability were observed in such prior art products.

The emulsions of the present invention are highly useful for many purposes and combine the advantages of fat/liquid water emulsions with those of the fat/-thickened water emulsions, without introducing the disadvantages of either system. Moreover, on an average a smaller amount of gelling agent is required than in systems in which the entire aqueous phase is gelled.

The gelled spherical ingredients can be present in the continuous fatty phase or in the dispersed liquid aqueous phase or in both.

Suitably the weight ratio between the continuous fatty phase and both the dispersed phases is (20-80): (80-20), preferably (35-65): (65-35), particularly about 40:60. The invention is particularly useful for the preparation of low-fat spreads, which frequently—as a result of the volume ratio between the continuous and dispersed phases—have too watery a taste sensation. A suitable weight ratio between the liquid aqueous phase and the gelled dispersed phase is e.g. from (85-15): (15-85). The average droplet size of both dispersed phases can be the same or about the same or of a different order of magnitude.

By having coarse dispersed gelled spherical ingredients (e.g. 10–20μdiameter) and fine liquid aqueous phase droplets (e.g. 1–5μdiameter) the viscosity of the emulsion at palate temperature may be reduced. The gelled spherical ingredients are preferably prepared from essentially aqueous constitutents.

Alternatively a low-fat spread can be provided with small gelled droplets (e.g. 1–5μdiameter) and relatively coarse water drops (e.g. 10–20μdiameter). When in such systems all the salt is present in the free water droplets, the flavour release will be speeded up. In general, however, small liquid drops combined with coarse gelled drops are preferred, since coarse water droplets may easily cause water separation, e.g. during spreading the product on bread, which will give a crumbly appearance.

Gelling can be effected before, but preferably during emulsification of the fatty and liquid aqueous ingredients. By proper selection of the gelling conditions, in situ separation of liquid aqueous phase from gelled dispersed ingredients can take place due to syneresis.

The invention is particularly concerned with a process of preparing fat-continuous emulsions by dispersing in fat both a liquid aqueous phase and gelled spherical aqueous ingredients.

Preferably the emulsions are prepared by using gelled spherical ingredients that have been obtained by emulsifying a liquid gelling agent containing aqueous phase in a fatty phase, letting the gelled spherical ingredients form in situ, and by subsequently dispersing a non-gelling liquid aqueous phase in the emulsion obtained to prepare the emulsion containing both dispersed liquid and dispersed gelled constituents.

Finally, emulsions can be prepared by using gelled spherical ingredients that have been obtained by emulsifying a liquid gelling agent containing aqueous phase in a fatty phase, letting the gelled spherical ingredients form in situ, and by blending the emulsion obtained with another fat-continuous emulsion containing a dispersed liquid aqueous phase.

In principle there are no limitations to the fat or fat blend to be used in the emulsions of the present invention.

Fats that are liquid at room temperature can be used in preparing pourable fat-continuous emulsions and fats that are plastic at room temperature are useful for the preparation of plastic emulsions, e.g. margarines and low-fat spreads.

Preferably the fat-continuous emulsions contain a fatty phase of a dilatation value at 10° C. of at least 150, preferably at least 250, and at 35° C. of no more than 50, preferably no more than 25.

The liquid aqueous phase of the emulsions of the invention can consist of water, but preferably the aqueous phase contains proteins and can, for instance, consist of or contain skim-milk, full-fat milk, buttermilk, etc.; similarly protein-enriched concentrates can be used or reconstituted proteinaceous solutions or dispersions, e.g. obtained by blending skim-milk powder, buttermilk power etc. etc. in water. The presence of proteins in at least the liquid dispersed aqueous phase will help to destabilize the emulsion under palate conditions.

Any type of protein can be present in either the gelled spherical ingredients or in the liquid aqueous phase or in both. Suitably, proteins are, for instance, incorporated at a level of between about 0.1 and 20% of the dispersed phases, preferably between about 1 and 18% of the dispersed phases.

The emulsions preferably also contain emulsifiers, e.g. phosphatides and/or partial glyceride esters, for instance monoglycerides, for stabilizing the emulsion.

The spherical ingredients preferably contain hydrocolloids, e.g. gelatin, agar, alginate, carrageenan, etc. The concentration of the hydrocolloids in the aqueous system from which the gelled spherical ingredients are prepared is determined by the nature of the hydrocolloid, the yield point desired and the conditions under which gelling is performed. Suitable concentrations will vary from about 0.2-5% by weight of the aqueous system to be gelled.

The invention will be illustrated by the following Examples:

EXAMPLE I

A low-fat spread of a fat content of about 60% was prepared by combining equal parts of W/O Emulsion A of a temperature of 17° C. and W/O Emulsion B of a temperature of 20° C. in a surface-scraped heat exchanger (Votator A unit) in which the combined emulsion is cooled to 0° C.; finally the emulsion obtained is mildly agitated and further crystallised in a post-crystalliser unit (Votator B unit) and packed at 17° C.

Emulsions A and B were separately prepared by blending and emulsifying fatty and aqueous ingredients in separate vessels and cooling the emulsions in scraped-surface heat exchangers to the temperatures indicated.

The emulsions were composed of (wt.%):

|  | A | B |
|---|---|---|
| Water | 35.47 | 38.08 |
| Salt | 1.89 | 2.0 |
| Dicalcium phosphate | 0.34 | — |
| Sodium citrate | 0.38 | — |
| Glucose | 0.89 | — |
| Sodium alginate | 0.64 | — |
| Glucono-delta lactone | 0.47 | — |
| Oil blend | 59.68 | 59.68 |
| Distilled monoglycerides from lard | 0.2 | 0.2 |
| Colour | 0.02 | 0.02 |
| Flavour | 0.02 | 0.02 |

(Finely powdered dicalcium phosphate (average particle size less than 1 micron) was present in A as the $Ca^{2+}$ source, the citrate as the complexing agent and the glucono-delta-lactone as the $Ca^{2+}$ release agent; by slow release of $Ca^{2+}$ a calcium alginate gel is formed in the dispersed aqueous phase provided by A).

EXAMPLE II

Example I was repeated, except that 60% by wt. of the fat blend (including 0.2% of monoglycerides from lard and 0.1% of lecithin) was combined with aqueous phases which were composed of:

| Ingredients: | A gelled aqueous phase | B liquid aqueous phase |
|---|---|---|
| Skim-milk powder | 0.6 | |
| Na-alginate | 0.25 | |
| Glucono-delta lactone | 0.14 | |
| CaHPO₄ (anhydrous) | 0.01 | |
| Na-citrate | 0.06 | |
| K-sorbate | 0.07 | 0.07 |
| Salt | | 1.5 |
| Lactic acid | | 0.02 |
| Water | 18.87 | 18.41 |
| Total | 20 | 20 |

The product of Example II was, in respect of its organoleptic properties, preferred to that of Example I.

EXAMPLE III

A W/O emulsion was prepared at 40° C. from 20 parts by weight of an aqueous phase (2.2 parts whey powder, 0.7 parts gelatin, 0.02 parts K-sorbate, 0.09 parts lactic acid and 16.99 parts water) and 40 parts by weight of a plastic fatty phase (39.65 parts fat blend, 0.2 parts monoglyceride and 6 ppm of β-carotene). The emulsion obtained was cooled to 10° C. in a Votator A unit and subsequently crystallised in a mildly stirred crystalliser unit.

To the crystallised emulsion obtained another 40 parts by weight of aqueous phase of 15° C. were added in a subsequent crystalliser unit (0.05 parts K-sorbate, 0.03 parts lactic acid and 39.92 parts water) and the W/O emulsion thus formed was subsequently cooled in another Votator A unit to 10° C. and crystallised in a post-crystalliser unit and finally liquid-filled at 12° C. into plastic tubs.

As compared with a product prepared from identical ingredients, but with one combined aqueous phase, the product of the invention had better emulsion stability.

We claim:

1. An edible fat spread of the water-in-oil emulsion type comprising an aqueous phase consisting of (a) a finely dispersed non-gelled aqueous phase of a droplet size ranging from 1 to 5 microns, and (b) coarsely dispersed aqueous gelled spherical droplets of a droplet size ranging from 10 to 20 microns which contain a gelling agent and at 15°-20° C. have a gel strength ranging from 0.1 to 30 N/cm² as measured with an Instron apparatus employed in the linear compression test mode performed at room temperature, wherein the weight ratio of (a):(b) is 85-15: 15-85 and the weight ratio of the continuous fat phase to the combined dispersed phases is 20-80: 80-20.

2. Emulsion according to claim 1, wherein the weight ratio of the continuous phase to the combined dispersed phases is 35-65: 65-35.

3. A process for preparing a fat spread according to claim 1, comprising
  (i) producing a water-in-oil emulsion which contains a gelling agent in the aqueous phase;
  (ii) producing a second water-in-oil emulsion from an oil phase and an aqueous phase which does not contain any gelling agent;
  (iii) combining said emulsions to obtain a final emulsion containing gelled and non-gelled aqueous phases; and
  (iv) cooling and working the final emulsion in a surface-scraped heat exchanger to obtain a fat spread.

* * * * *